Figure 1:
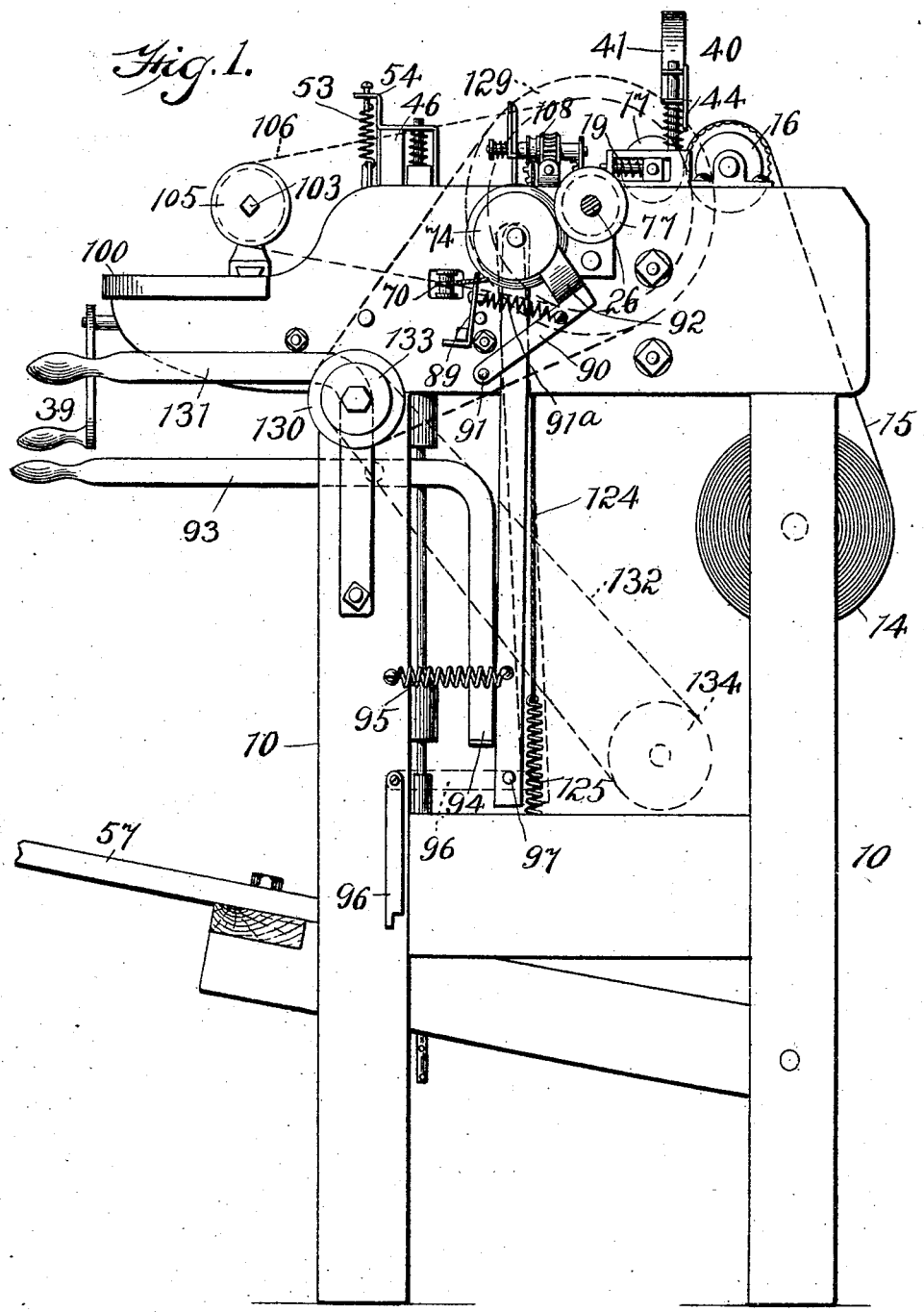

No. 883,795.

PATENTED APR. 7, 1908.

E. O. ENGBERG.
MACHINE FOR MAKING WINDOW SHADES.
APPLICATION FILED AUG. 16, 1907.

8 SHEETS—SHEET 1.

Witnesses:
H. G. Dieterich
L. H. Lundin

Inventor
E. O. Engberg
By his Attorneys
Criswell & Criswell

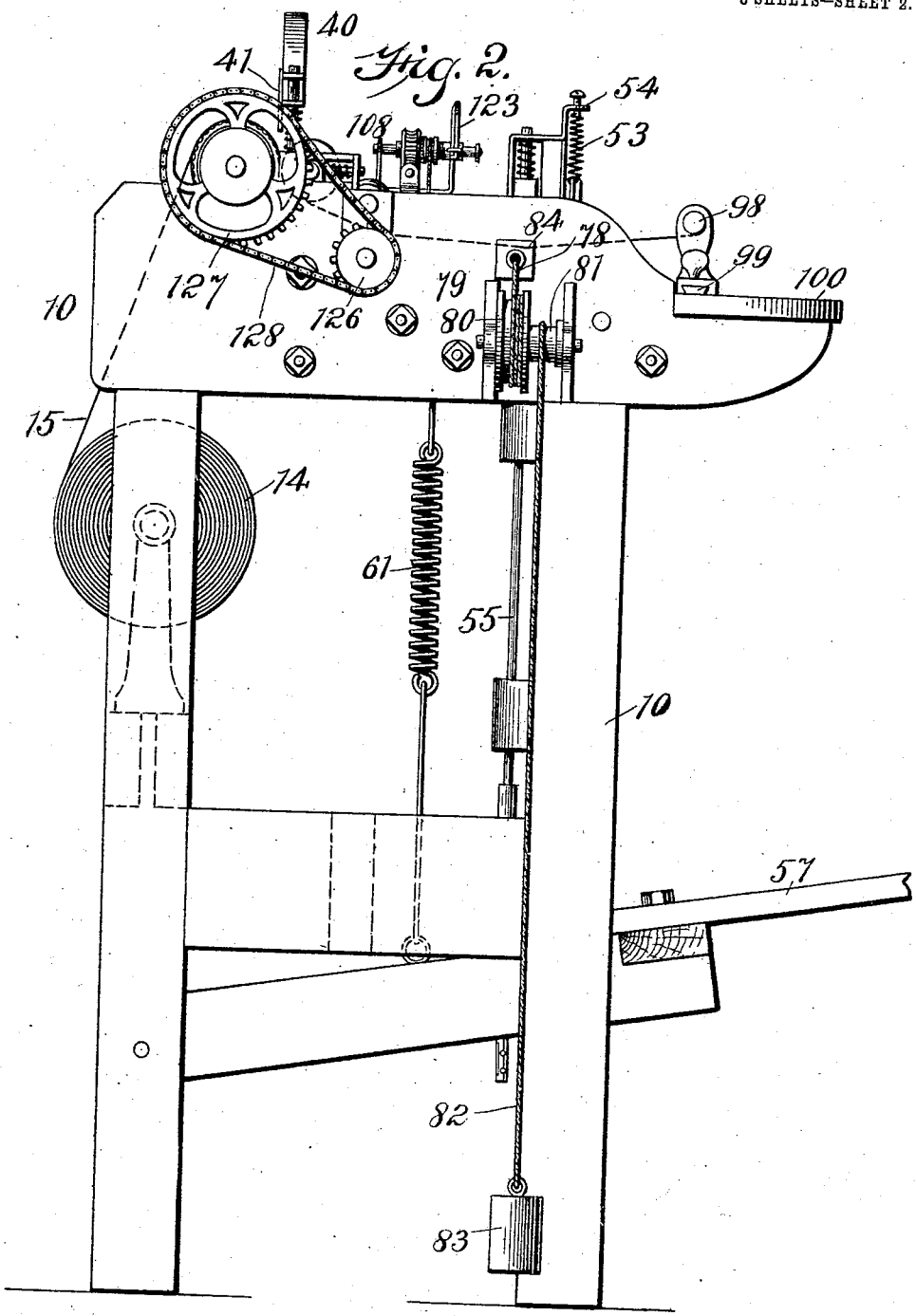

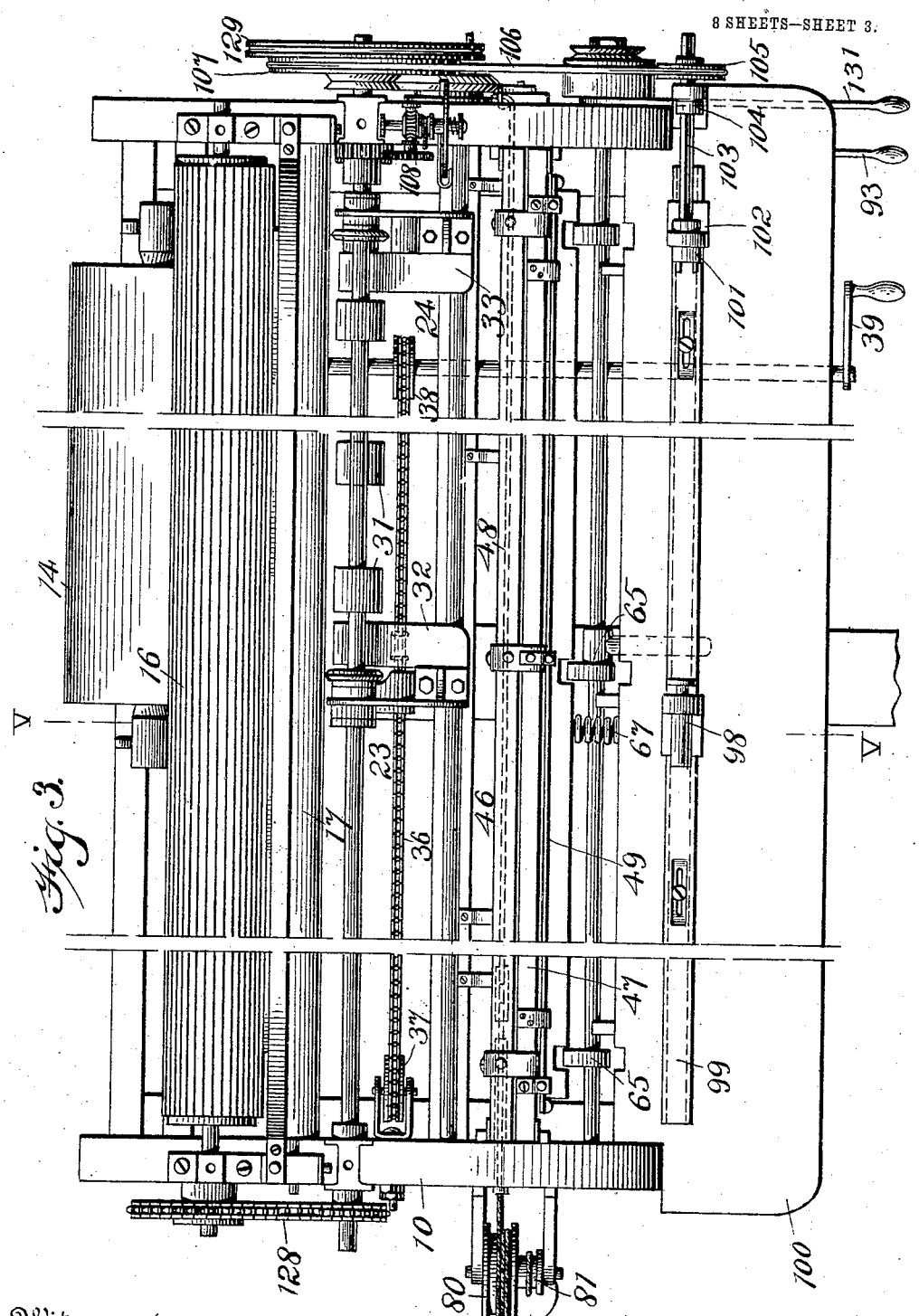

No. 883,795. PATENTED APR. 7, 1908.
E. O. ENGBERG.
MACHINE FOR MAKING WINDOW SHADES.
APPLICATION FILED AUG. 16, 1907.
8 SHEETS—SHEET 4.
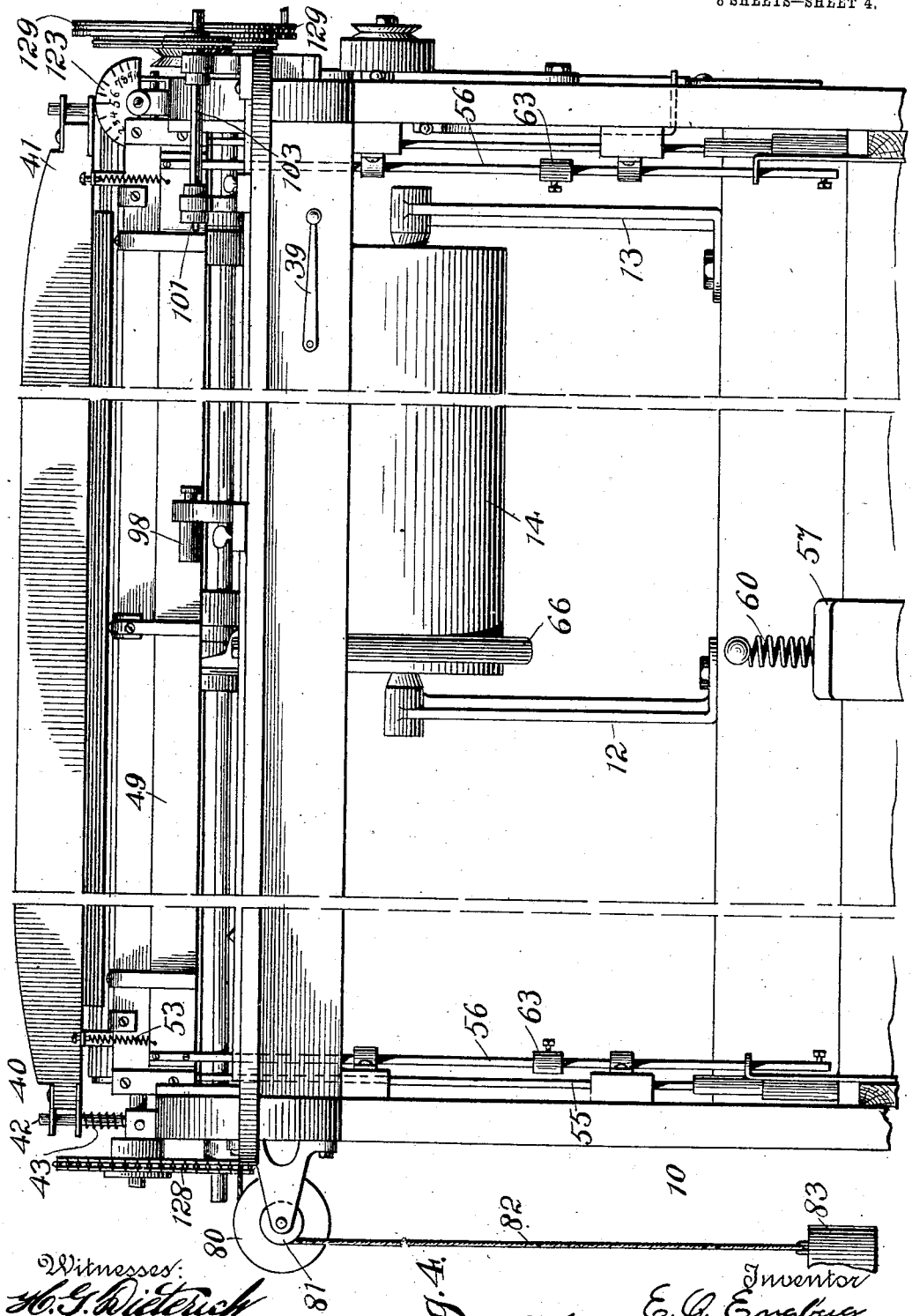

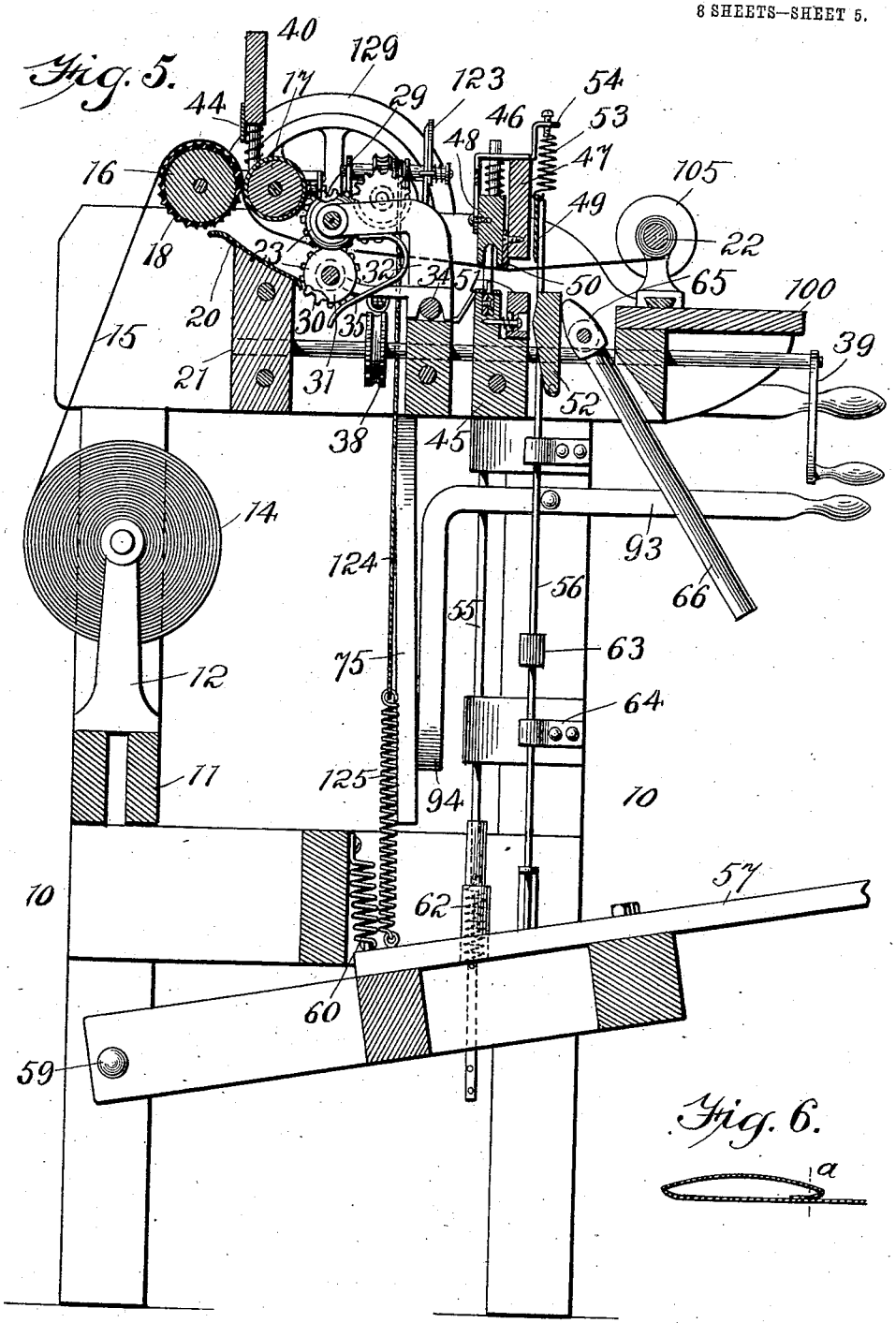

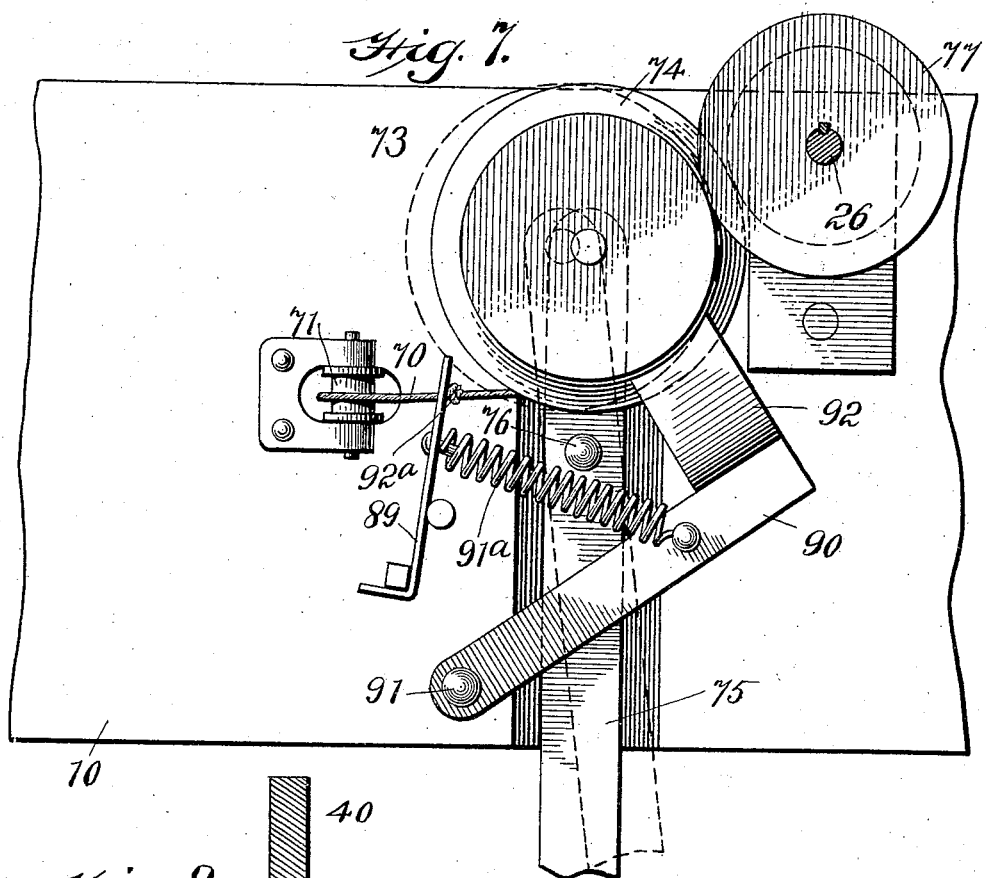

No. 883,795. PATENTED APR. 7, 1908.
E. O. ENGBERG.
MACHINE FOR MAKING WINDOW SHADES.
APPLICATION FILED AUG. 16, 1907.
8 SHEETS—SHEET 7.
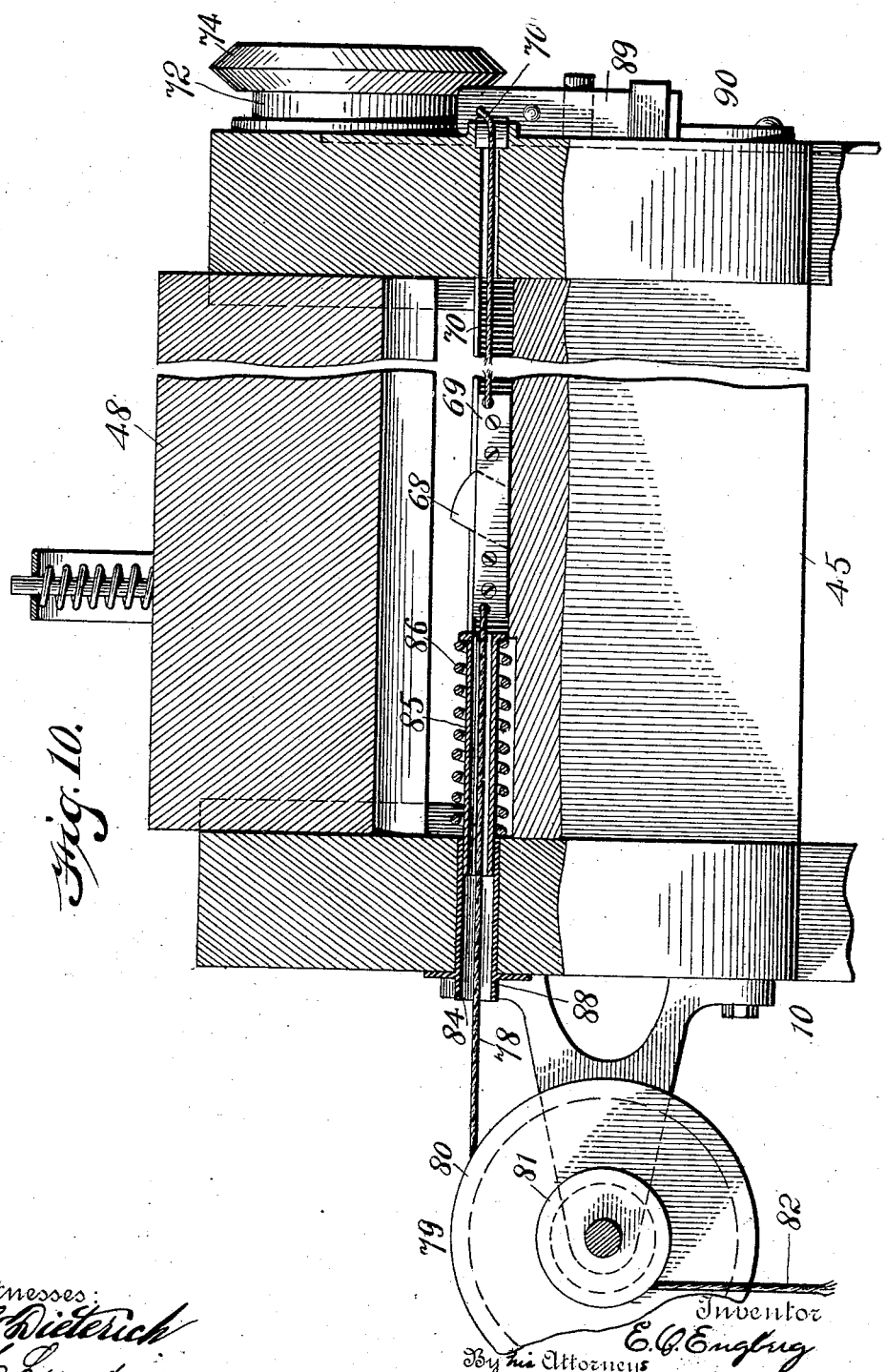

No. 883,795. PATENTED APR. 7, 1908.
E. O. ENGBERG.
MACHINE FOR MAKING WINDOW SHADES.
APPLICATION FILED AUG. 16, 1907.
8 SHEETS—SHEET 8.
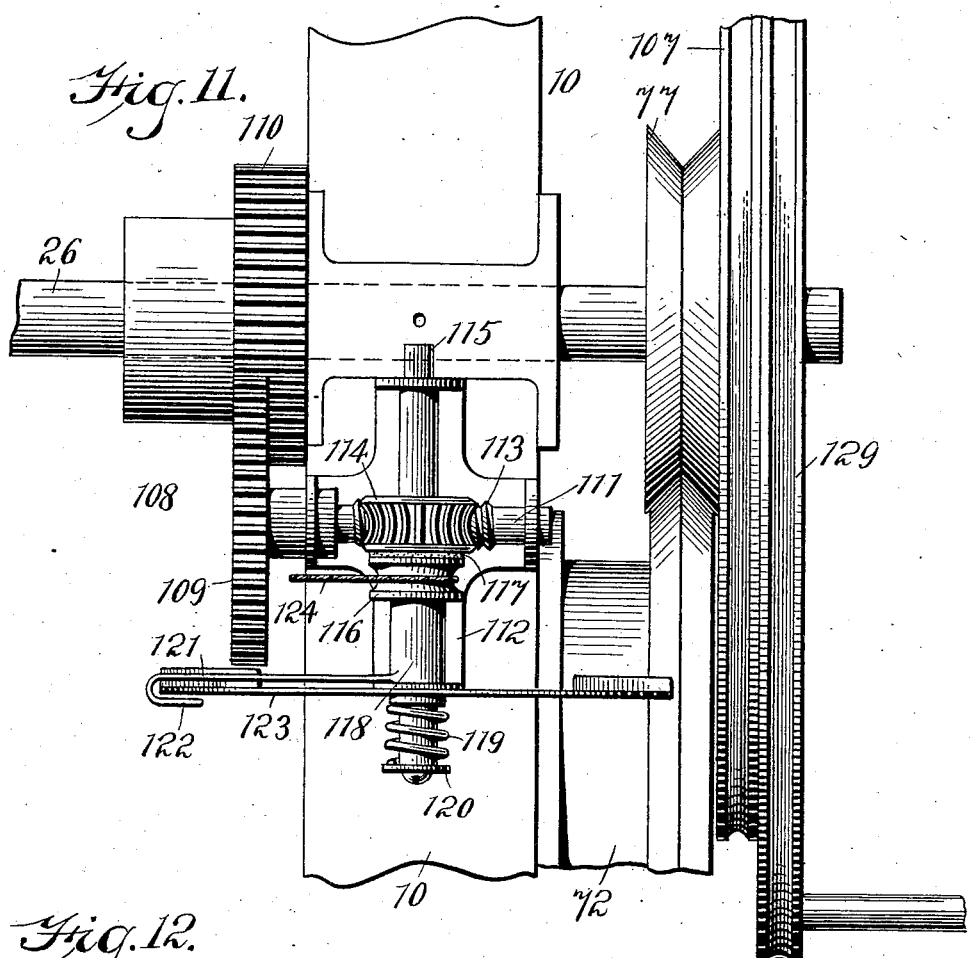
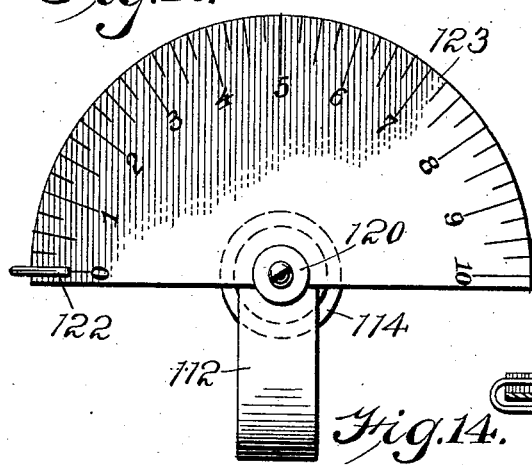
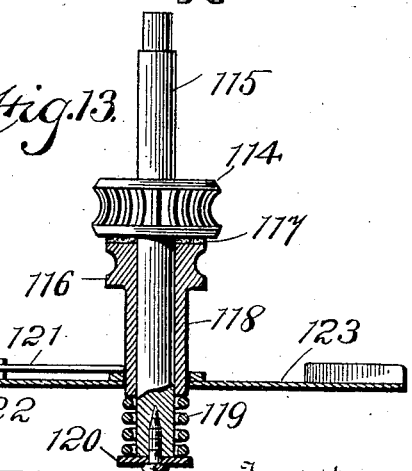
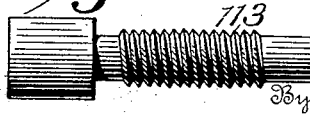
Witnesses:
H. F. Dieterich
L. H. Lundin
Inventor
E. O. Engberg
By his Attorneys
Criswell & Criswell

UNITED STATES PATENT OFFICE.

EPHRAIM O. ENGBERG, OF SALT LAKE CITY, UTAH, ASSIGNOR TO JOHN BEECHER PATTON, OF KENT, OHIO.

MACHINE FOR MAKING WINDOW-SHADES.

No. 883,795.          Specification of Letters Patent.          Patented April 7, 1908.

Application filed August 16, 1907. Serial No. 388,868.

*To all whom it may concern:*

Be it known that I, EPHRAIM O. ENGBERG, a citizen of the United States, and a resident of Salt Lake City, county of Salt Lake, and State of Utah, have invented certain new and useful Improvements in Machines for Making Window-Shades, of which the following is a full, clear, and exact description.

This invention relates more particularly to machines such as is disclosed in my Reissue Patent No. 12,445, dated February 6th, 1906, and in my pending application Serial No. 281,474, filed October 5th, 1905, for machines for making window shades.

The primary object of my invention is to improve certain features of the machine disclosed in the patent and application referred to, and to provide simple and efficient means whereby the material or goods employed in the manufacture of window shades may be quickly and accurately cut both lengthwise and transversely thereof from a web or roll, one end wound automatically upon a shade roller, and the other end folded to form a loop or hem for the usual shade slat.

Another object of the invention is to provide simple and efficient means whereby the material may be accurately measured as the shade is being wound upon the shade roller.

Further objects of the invention are to provide simple and effective means for operating the transverse knife; and to provide means for threading and forcing the material between the feed rolls.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is a side elevation of the machine looking at the opposite side to that shown in Fig. 1. Fig. 3 is a plan view, partly broken away, showing the general arrangement of all the parts. Fig. 4 is a front elevation, the lower part of the frame being broken away. Fig. 5 is a vertical transverse section, partly in elevation, taken on the line V—V of Fig. 3. Fig. 6 is a detail view showing the form of fold or loop for the shade slat. Fig. 7 is a side elevation, partly broken away, and on an enlarged scale, of the means for forcing the transverse cutting knife across the machine to cutting position. Fig. 8 is a vertical section, on an enlarged scale, of the means for threading or forcing the material between the feed rolls. Fig. 9 is an enlarged fragmentary section, partly in elevation, of the edge cutting or lengthwise trimming cutters. Fig. 10 is a detail section, partly in elevation, on an enlarged scale, of the means for operating the transverse cutting knife. Fig. 11 is a fragmentary plan view, on an enlarged scale, of the means for measuring the length of the shade; and Figs. 12 to 14 are other views of the measuring device.

As in the patent and application referred to, the machine herein shown is more particularly applicable for use in connection with the jobbing trade, where a large variety of sizes of window shades, both in lengths and widths, are to be made as is the case with many manufacturers of this class of goods. It is desirable in such a machine that the parts be readily adjustable and not necessarily entirely automatic, but it is to be understood, however, that any or all of the parts may be operated by power instead of manually if desired, or the machine may be made to make only one or several sizes of shades.

The frame 10 may be of any suitable form, and between the ends of the frame is a bar 11 on which are held the centers 12 and 13, one or both of which are adjustably held on said bar. A roll 14 of fabric, goods or shade material 15 is supported between the centers 12 and 13, and is led over a roll 16, and between said roll and a tension roll 17. The roll 16 may be of wood or metal, and may be covered with a layer of corrugated rubber or other yielding surface 18; while the roll 17 is loosely held in boxes, and normally forced toward the roll 16 by means of springs 19. The material is gripped between the rolls 16 and 17 with sufficient force to be readily drawn from the roll 14, and is fed forward over a plurality of guides plates 20 secured to a fixed bar 21. The inner end of the material is fastened in the usual manner to the shade roller 22, either by tacks or by special clamping means, and as the roll 16 and the shade roller 22 are positively operated as hereinafter described, the material will be forced inward, and will be wound on the shade roller.

The material may be trimmed or cut along either or both edges. As shown in Figs. 3, 5, and 9, there are two sets of cutters or knives 23 and 24, one for each side. The cutters 25 of each set are held on the main drive shaft 26, and the cutters 27 are likewise held to the shaft 28 and rotate in unison through the gears 29 and 30, the material being supported between the cutters by the rolls 31, carried by the cutter shafts. The cutters are beveled on one side and the cutters 25 of each set are arranged above the cutters 27. Each cutter is fastened to a rotatable sleeve, which is splined to the shafts 26 and 28, or said sleeves with the cutters may be other wise secured to or held in the brackets 32 and 33, which support and carry the cutters. The brackets of each set of cutters comprise two members, which are fastened together, and with both sets of cutters are adjustable along the shafts 26 and 28, and where they are fastened together they slide along a round bar 34 or other guide, said brackets being grooved to partly encircle said bar. A guide 35 is fastened to one of the members of each bracket, and is intended to direct the part of the material cut from the web as the shade is trimmed at its edges and force the same downward so that it will not interfere with other working parts of the machine. The lower member of one of the brackets has an endless chain 36 by which quick adjustment of the set of cutters is obtained. This chain, Fig. 3, passes around pulleys or sprockets 37 and 38, one of which is operated by the handle 39, so that as said handle is operated the set of cutters will be quickly adjusted to the proper width of the shade to be made.

The parts thus far described with the exception of the particular form of guide bar for the brackets, and the guide for directing the material away from the other parts of the machine is substantially the same as set forth in my application already referred to.

Where the material is wide, and where it is inclined to buckle and get out of shape, it is often difficult to thread the material between the feed-rolls 16 and 17, and to permit this to be done quickly I support on the frame over the feed-rolls a device 40. This device comprises a transverse bar 41, which is slidingly held on the upright posts 42 projecting upward from the machine frame and under the bar 41, and around the rods are springs 43 which normally force the bar 41 upward. A blade 44 is secured to one side of the bar 41, and is adapted to enter between the rolls 16 and 17 as the same is forced downward, the springs 43 tending normally to force the bar 41 and blade 44 upward above the said feed-rolls. As will be seen if the material is forced over the rolls 16 and 17, and the device 40 is forced downward by hand or otherwise the material throughout its entire width will be forced downward between the rolls, so that as soon as the device 40 is released the feed-rolls will grip the material to feed the same forward.

The construction and operation of the means for forming the shade-slat loop or hem transversely of the material is substantially the same as disclosed in my pending application. As shown the shade material passes over a fixed transverse bar 45 securely held between the ends of the frame and the forward end of the material is fastened to the shade roller 22 and is wound thereon according to the length of the shade to be made. Above the bar 45 and the material is a vertically movable cross-head 46. This head is suitably guided in the frame, and comprises the parts 47 and 48, and an independently movable member or blade 49. The member 48 is held to move relatively with respect to the member 47, and is adapted to initially clamp the material against the upper surface of the transverse bar 45. A blade 50 is secured to the member 47, and this blade forces the material in a space between the transverse bar 45 and a slidingly held bar or member 51 of the creasing device, so that the material will be creased or folded by said blade. A second fold to form the shade-slat loop is made by the blade 49, and this blade is independently movable with respect to the blade 50, and carries the material into the space between the sliding bar 51, and a pivotally held member 52 of the creasing device in substantially the same way as in the application referred to. The blade 49 is held by springs 53 to the brackets 54 of the cross-head, and the cross-head and blades are connected at each end by means of vertical rods 55 and 56 to a treadle 57. This treadle 57 is pivoted at 59 to the machine, and is normally forced upward by springs 60 and 61 secured to the frame and to the treadle. The rods may have a certain amount of play to permit independent movement of the treadle, and both sets of rods are suitably guided on the frame 10. The rods 55 at their lower ends are yieldingly connected to the treadle, as by springs, which may be inclosed by a tubular device 62, and the rods 56 are provided with adjustable stops 63 which engage the brackets 64 of the frame. The springs of rods 55 permit the treadle to continue its movement after the cross-head is stopped by the transverse bar 45, and the stops 63 by engaging the brackets 64 limit the downward movement of the blade 49 and determines the size of the shade-slat loop. On downward movement of the treadle two folds will be formed in the material as in my pending application, and on forcing the member 52 of the creasing device toward the bar 45 by means of cams 65 operated by a lever 66, the said material will be positively creased as shown best in Fig. 6, a spring or springs 67 being provided to restore the member 52 to its normal position.

Immediately after the cross-head is forced downward by the treadle 57 so as to clamp the material against the bar 45 the said material is cut transversely by means of a knife 68, Fig. 10, securely held in the knife-bar 69. This knife-bar 69 is guided in a slot in the transverse bar 45 of the loop-forming means, and is adapted to move immediately under the yielding member 48 of the cross-head, the said yielding member being provided with a slot or groove at its under edge to permit the knife to properly cut the material. A flexible connection 70 is secured at one end of the knife-bar, and extends outward through the machine-frame around a guide roll 71, and is secured to a drum 72 of the friction mechanism 73 which forces the knife transversely of the machine to cutting position. The drum 72 is on the same axis as the friction wheel 74, and both friction wheel and drum, Fig. 7, are carried on the end of a lever 75, which is pivoted at 76 to the machine frame. The friction wheel 74 engages direct with the friction wheel 77 arranged on the main drive shaft 26, so that as the latter is rotated the said friction wheel 77 will cause the wheel 74 and drum 72 to rotate, and wind the flexible connection 70 on the drum and thereby force the knife-bar 69 across the machine under the material preparatory to cutting the same. The knife is forced in the opposite direction by means of a flexible connection 78 secured at one end to the knife-bar 69, and at its other end to a drum 79. This drum is held in brackets projecting outward from the frame and comprises two parts 80 and 81, the latter of which is smaller than the part 80. A connection 82 is secured to the part 81 of the drum, and on the end of this connection is a weight 83, which may be arranged to move in a suitable tubular guide. As soon as the knife is released, as will be presently described, the weight 83 will force the knife 68 quickly across the machine, thereby cutting the material.

A cushioning device 84, Fig. 10, is arranged at one end of the machine, and comprises a tubular bar or member 85, around which is a spring 86. The tubular part or bar 85 is guided in a bushing or sleeve 88 in the machine frame, and when the knife-bar 69 is drawn across the machine by the weight 83, the spring will yield and take the shock of the knife.

The flexible connection 70 passes through an aperture in the movable arm 89. This arm 89 is yieldingly connected to a brake 90 by means of a spring 91$^a$. The brake 90 is pivoted at 91 to the machine frame, and has its end 92 adapted to engage the friction wheels 74. The flexible connection 70 is provided with an enlarged part 92$^a$, which is larger than the aperture in the arm 89, and is adapted to move the arm on its pivot when the knife has been forced substantially across the machine by the weight 83. This will move the arm 89 on its pivot, and through the spring 91$^a$ will cause the brake 90 to engage the friction wheel 74 with a yielding pressure, and thereby assist in stopping the knife as it is forced across the machine.

To secure the release of the knife to permit it to be forced transversely of the machine, the lever 75 has its lower end in the path of movement of a lever 93. This lever 93, Fig. 1, is pivoted on the inside of the machine frame, and has its lower end 94 bent so that when forced downward by the hand, the said end will engage and shift the lever 75 on its pivot and thereby remove the friction wheel 74 out of engagement with the friction wheel 77. A spring 95 normally forces the lever 75 in one direction, so as to cause the engagement of the friction wheels, and as soon as the lever 93 is released the spring 95 will force the lever 75 to the position shown in Fig. 1 to permit the knife to be forced transversely of the machine. A lever or detent 96 is pivoted to the machine frame, and has its end notched to engage a pin 97 on the lever 75, by which the friction wheels may be held disengaged and the machine operated without moving the transverse cutting knife.

The shade roller 22 is supported at one end by a yielding tail-piece 98, and said tail-piece is adjustably held upon a plate 99 which is adjustable along the table 100 of the machine frame. The end of the roller is engaged and rotatably supported by a chuck 101, and said chuck is held in a bracket 102, which is adjustable along the plate or bar 99. The end of the chuck has a shank or spindle 103 which is held in a bearing 104, and on the end of the spindle is a pulley 105. This pulley is driven by a slip belt 106, that passes around a pulley 107 on the main drive shaft 26, so that as said pulley 107 is rotated the spindle 103 and chuck 101 will cause the shade roller to be rotated to wind the shade material thereon as in my patent and pending application.

Various means may be employed in connection with the machine for measuring the length of shade. As one means I employ a device 108 shown best in Figs. 11 to 14. Here a gear 109 meshes with the gear 110 on the main drive and cutter shaft 26, and said gear 109 has its shaft 111 suitably journaled in a bracket 112 held to the machine frame. The shaft 111 is provided with threads or a worm 113, and this worm meshes with the worm gear 114, which is held to a shaft 115, and this shaft extends transversely or at right angles to the shaft 111, and is also journaled to rotate in the bracket 112. A pulley 116 is arranged to rotate on the shaft 115, and on the face of the pulley is a friction disk 117, which is carried by the pulley 116, and is adapted to engage the face of the worm gear 114. The pulley 116 has a sleeve 118, which is normally forced along the shaft 115 by means of a spring 119 arranged around the shaft 115 and between the end of the sleeve and a washer 120 secured to the end of said shaft. This spring 119 normally forces the disk 117 into engagement with the face of the worm 114 so that the pulley 116 will normally rotate with the worm gear 114. To the sleeve 118 is secured an arm 121, and this arm has its end bent inward and downward to form a pointer 122, and this pointer is adapted to move along or around a dial plate or indicator 123. This dial plate is semi-circular and is provided with a scale to indicate the number of feet and parts of a foot of the shade according to the length of shade which is to be made. As shown the scale is made for ten feet, though this may be varied as desired. The pulley 116 has a flexible connection, as a cord or wire 124, secured thereto and this cord or wire is connected by a spring 125 to the treadle 57. As will be seen when the main drive shaft 26 is rotated, the gears will impart motion to the worm 113, and through the worm to the worm gear 114, and by reason of the friction disk 117 will cause the pointer 122 to move around the dial plate to measure the length of shade. As the treadle 57 is forced downward to form the loop for the shade slat, the flexible connection 124 and spring 125 will cause the pulley 116 to rotate in the opposite direction, and thereby restore the pointer to its normal position, there being sufficient slack in the cord or connection to permit the parts to operate properly.

Any suitable timing and operating means may be employed, and where a standard size of shade is made or in any other case, when desired, all or any of the several mechanisms may be operated by power from a common shaft. The lower cutter shaft at one end is provided with a sprocket 126, Fig. 2, and on one side of the shaft of the feed-roll 16 is a sprocket 127 around both of which sprockets pass a chain 128 for positively driving the feed-roll, though gears may be used instead of the chain and sprockets. A wheel 129 is secured at one end to the main drive shaft 26, and this wheel may have a handle to manually operate the same or said wheel may be grooved to adapt the same to be operated by a suitable motor. If driven by a motor, a belt passes from the wheel 129 to a small pulley 130 held to rotate on a lever 131, which lever is pivoted to the side of the frame as is shown best in Fig. 1. A second belt 132 passes around a pulley 133 also held to rotate with the pulley 130 on the pivoted lever, and this belt passes around the pulley 134 arranged on the motor shaft as indicated in dotted lines in said figure, and which motor may be suitably supported on the machine frame. The pivoted lever 131, carrying the pulleys, is arranged to take up the slack in the belts when the handle thereof is forced downward, and will thereby operate the machine through the motor, and by releasing the handle, the power wheel 129, may be operated by hand, though the motor and the connections may be entirely dispensed with if desired.

In operating the machine the material is passed around and between the rolls 16 and 17 and through the machine as shown in Fig. 5. The front edge of the material is fastened in the usual manner to the shade roller, and the drive shaft 26 started. This will feed and trim the material and will rotate the shade roller to wind the proper amount of material thereon, at the same time the drum 72 will be rotated and will force the knife 68 across the machine to cutting position. The treadle 57 is now depressed to force the cross-head 46 downward so as to clamp the material between the stationary bar 45 and the clamping member 48 of said head. The lever 93 is forced downward to release the friction wheel 74 and the drum 72. This will permit the weight 83 and it connections to quickly force the knife in the opposite direction to cut the material, and as the material is being cut, or immediately thereafter, the treadle is further depressed which will cause the folding blade 50 to force the material adjacent to the knife between the bar 51 and the bar 45 withdrawing the cut end from beneath the clamping member of the cross-head. Further movement of the head will be arrested by the bar 45, and on further movement of the treadle, the folding blade 49 will engage the material and form a second bend and will force the material between the bar 51 and the pivoted or swinging member 52. The treadle is now released and the cams 65 moved to force the bar 51 and the device or member 52 toward the stationary bar or member 45 to finish the folds or creases, the cams being released and the creasing devices permitted to return to their inactive position. This forms two distinct creases in the material at one end, and as soon as the creasing devices and the folded material are released the material will fold over in the manner substantially as shown in Fig. 6, after which it is stitched along the line $a$, thus completing the loop or socket into which the usual slat is slipped. One curtain or shade is now finished and the next is completed in a similar manner by placing a new shade roller in the machine and bringing the severed edge of the stock forward and securing it to the roller and operating the parts as already described.

From the foregoing it will be seen that simple and efficient means are provided whereby a shade may be accurately made from a web or roll of shade material and wound upon the shade roller, that the material may be quickly threaded or made to be engaged by the feed rolls, that simple means is provided for measuring the length of shade to be made, and that simple and efficient means is provided for operating the transverse cutting knife.

Having thus described my invention, I claim as new and desire to secure by Letters Patent:—

1. In a machine of the character described, the combination with means for holding shade material, of means for rotating a shade roller to wind the material thereon, folding means acting on the material and forming the loop for the shade-slat, a transversely movable knife, together with a cushioning device arranged in the path of the knife at one end of its travel.

2. In a machine of the character described, the combination with means for holding shade material, of means for rotating a shade roller to wind the material thereon, folding means acting on the material and forming the loop for the shade-slat, a transversely movable knife, a spring-pressed cushioning bar or device arranged in the path of the knife, and means for forcing the knife across the machine.

3. In a machine of the character described, the combination with means for holding the shade material, of folding and creasing means for folding and creasing the material transversely thereof and forming the loop for the shade-slat, a knife adapted to move transversely of the machine, means for forcing the knife in one direction to cut the material, a friction wheel, a second friction wheel normally engaging the first-mentioned friction wheel, a drum movable with the latter wheel, means connecting the drum to the knife, a pivoted lever to which the second friction wheel is held, and means for normally keeping the friction wheels in engagement to force the knife across the machine to cutting position.

4. In a machine of the character described, the combination with means for holding the shade material, of means for forming the loop for the shade-slat, a knife adapted to move transversely of the machine, means for forcing the knife in one direction to cut the material, a friction wheel, a second friction wheel normally engaging the first-mentioned friction wheel, means connected to the second friction wheel and to the knife, a pivoted lever to which the second friction wheel is held, and a spring for normally keeping the friction wheels in engagement to force the knife across the machine to cutting position.

5. In a machine of the character described, the combination with means for holding the shade material, of means for forming the loop for the shade-slat, a knife adapted to move transversely of the machine, a two-part drum and a weight for forcing the knife in one direction to cut the material, a friction wheel, a second friction wheel normally engaging the first-mentioned friction wheel, and means for normally keeping the friction wheels in engagement to force the knife across the machine to cutting position.

6. In a machine for making window shades, the combination with means for holding shade material, of means for forming the loop for the shade-slat, a transversely movable knife adapted to cut the material, a fixed rotatable friction wheel, a pivotally held lever, a friction wheel carried by the end of the lever and normally engaging the fixed rotatable friction wheel, a drum carried by the lever and rotatable with the friction wheel thereon, a flexible connection between the drum and the transversely movable knife, a spring normally forcing the lever in one direction so as to cause the friction wheels to engage and thereby force the knife to cutting position, means for forcing the knife in the opposite direction, together with means for releasing the friction wheel and drum.

7. In a machine for making window shades, the combination with means for holding shade material, of means for forming the loop for the shade-slat, a transversely movable knife adapted to cut the material, a fixed rotatable friction wheel, a pivotally held lever, a friction wheel carried by the end of the lever and normally engaging the fixed rotatable friction wheel, a drum carried by the lever and rotatable with the friction wheel thereon, a connection between the drum and the transversely movable knife, means normally forcing the lever in one direction so as to cause the friction wheels to engage and thereby force the knife to cutting position, a two-part drum in line with the plane of movement of the knife, a weight attached to the drum for forcing the knife in the opposite direction, together with means for releasing the friction wheel and drum.

8. In a machine for making window shades, the combination with a frame and means for holding shade material, of means for forming the loop for the shade-slat, a transversely movable knife adapted to cut the material, a fixed rotatable friction wheel, a pivotally held lever, a friction wheel carried by the end of the lever and normally engaging the fixed rotatable friction wheel, a drum carried by the lever and rotatable with the friction wheel thereon, a connection between the drum and the transversely movable knife, means normally forcing the lever in one direction so as to cause the friction wheels to engage and thereby force the knife to cutting position, means for forcing the knife in the opposite direction, together with a lever pivoted to the frame and having one end in the path of the lever carrying the friction wheel for releasing the friction wheel and drum.

9. In a machine for making widow shades, the combination with means for holding the shade material, of means for forming the loop for the shade-slat, a transversely movable knife adapted to cut the material, a fixed rotatable friction wheel, a second movable friction wheel normally engaging the fixed rotatable friction pulley, a drum fixed to the movable friction wheel, a connection between the drum and the transversely movable knife, means normally forcing the friction wheels in engagement and thereby force the knife to cutting position, means for forcing the knife in the opposite direction, together with means for releasing the friction wheel and drum.

10. In a machine for making window shades, the combination with means for holding shade material, of means for forming the loop for the shade-slat, a transversely movable knife adapted to cut the material, a fixed rotatable friction wheel, a pivotally held lever, a second friction wheel carried by the end of the lever and normally engaging the fixed rotatable friction wheel, a drum carried by the lever and rotatable with the friction wheel thereon, a connection between the drum and the transversely movable knife, a spring normally forcing the lever in one direction so as to cause the friction wheels to engage and thereby force the knife to cutting position, means for forcing the knife in the opposite direction, means for releasing the friction brake and drum, a cushioning device at one end of the machine adapted to be engaged by the knife as it moves across the machine to cut the material, and brake mechanism automatically actuated during the travel of the knife for engaging the friction wheel at a predetermined time.

11. The combination with means for holding shade material, of means for forming the loop for the shade-slat, a transversely movable knife adapted to cut the material, means for forcing the knife to cut the material, means for forcing the knife to cutting position, and brake mechanism automatically actuated during the travel of the knife for engaging the knife-operating means at a predetermined time.

12. The combination with means for holding shade material, of means for forming the loop for the shade-slat, a transversely movable knife adapted to cut the material, means for forcing the knife to cut the material, means for forcing the knife to cutting position, and a brake mechanism automatically actuated during the travel of the knife to engage the knife operating means and including an arm, a pivoted brake lever, and a yielding connection between the lever and the arm.

13. In a machine of the character described, the combination with means for holding shade material, of means for forming the shade-slat loop, a transversely movable knife, means for moving the knife across the machine, and cushioning means comprising a sleeve fitting the frame, a movable device slidingly held in the sleeve, and a spring fitting around the movable device and adapted to force the same inward to cause the knife to engage the same as it is forced across the machine.

14. In a machine of the character described, the combination with a frame and means for holding shade material, of means for forming the shade-slat loop, a transversely movable knife, means for moving the knife across the machine, and a yielding device held on the frame to receive the force of the knife as it is moved across the machine.

15. In a window shade machine, the combination with means for forming the shade-slat loop, of a pair of feed-rolls, and a manually movable threading device arranged adjacent to the feed-rolls and adapted to force the material between the same.

16. In a window shade machine, the combination with means for forming the shade-slat loop, of a pair of feed-rolls, a manually movable threading blade arranged transversely of the machine over the feed-rolls and adapted to force the material between the same when moved downward, and springs for normally forcing the blade away from the feed-rolls.

17. In a window shade machine, the combination with a frame and means for holding shade material, of means for forming the shade-slat loop, a set of feed-rolls, guiding means under the feed rolls, a bar carrying a blade arranged over the feed-rolls and extending lengthwise thereof and adapted to force the material between said rolls, posts carried by the frame on which the bar is slidingly held, and springs normally forcing the bar away from the rolls.

18. The combination with means for holding shade material, of means for forming the loop for the shade slat, a knife, means for automatically forcing the knife transversely of the machine to cut the material, and a measuring device for measuring the length of shade to be made.

19. The combination with means for holding shade material, of means for forming the loop for the shade-slat, a knife, means for automatically forcing the knife transversely of the machine to cut the material, edge-trimming cutters, shafts for operating the cutters, and a measuring device operated from one of the cutter shafts for measuring the length of shade to be made.

20. The combination with a frame and means for holding shade material, of means for winding the material on a shade roller, trimming means for trimming the edges of the material, mechanism for folding and creasing the material transversely thereof to form the loop for the shade-slat, a cutting device movable transversely of the machine, mechanism automatically forcing the cutting device across the machine to cut the material transversely, a measuring device having a movable pointer for indicating the length of the shade to be made, means operatively connected with the edge-trimming means for operating the pointer in one direction, and means operated simultaneously with the loop-forming mechanism to restore the pointer to its normal position.

21. The combination with a frame and means for holding shade material, of means for winding the material on a shade roller, mechanism for folding and creasing the material transversely thereof to form the loop for the shade-slat, a cutting device movable transversely of the machine, mechanism automatically forcing the cutting device across the machine to cut the material transversely, a measuring device having a movable pointer for indicating the length of the shade to be made, means for operating the pointer in one direction, and means operated simultaneously with the loop-forming mechanism to restore the pointer to its normal position.

22. In a window shade machine, the combination with means for holding shade material, of means for forming the loop for the shade slat, a transversely movable knife, and a measuring device comprising a fixed semicircular dial, a pointer adapted to move around the dial, and means for operating the pointer.

23. The combination with a frame, of means for holding shade material, means for forming a shade-slat loop, a cutter shaft, a gear held to the cutter shaft, a second gear in mesh with the cutter shaft gear, a bracket, a worm having its shaft journaled in the bracket and rotatable with the second gear, a shaft also journaled in the bracket and extending at right angles to the worm shaft, a worm gear secured to the shaft, a sleeve rotatably held on the shaft, a pulley movable with the sleeve, a flexible connection attached to the pulley and adapted to rotate the same in one direction, means for causing the sleeve to rotate in the opposite direction as the worm gear is rotated, a spring arranged on one end of the shaft and normally forcing the sleeve and pulley toward the worm gear, a semi-circular and stationary dial plate arranged on the frame in which the end of the sleeve is journaled, an arm projecting outward from the sleeve, and a pointer carried by the arm which moves along the dial as the sleeve is rotated.

24. The combination with means for holding shade material, of means for forming a shade-slat loop, means for cutting the material transversely, edge-trimming cutters, brackets supporting the cutters in pairs, and a curved deflector or guide carried by each bracket for forcing the trimmed part of the material downward.

25. The combination with means for holding shade material, of means for forming a shade-slat loop, a knife, means normally moving the knife transversely of the material, together with a lever for holding the knife-operating means disengaged to permit the machine to operate without operating the knife.

This specification signed and witnessed this ninth day of August A. D. 1907.

EPHRAIM O. ENGBERG.

Witnesses:
R. L. DECKER,
AXEL JOHNSON.